(12) United States Patent
Kloeppel et al.

(10) Patent No.: US 9,573,317 B2
(45) Date of Patent: Feb. 21, 2017

(54) THERMOFORMING DEVICE

(71) Applicant: Robert Bosch GmbH, Stuttgart (DE)

(72) Inventors: Holger Kloeppel, Oetenberg (DE);
Martin Beck, Pluederhausen (DE);
Michael Birkner, Wetzlar (DE); Peter Walter, Ortenberg (DE)

(73) Assignee: Robert Bosch GmbH, Stuttgart (DE)

( * ) Notice: Subject to any disclaimer, the term of this patent is extended or adjusted under 35 U.S.C. 154(b) by 324 days.

(21) Appl. No.: 14/386,991

(22) PCT Filed: Feb. 18, 2013

(86) PCT No.: PCT/EP2013/053206
§ 371 (c)(1),
(2) Date: Sep. 22, 2014

(87) PCT Pub. No.: WO2013/139544
PCT Pub. Date: Sep. 26, 2013

(65) Prior Publication Data
US 2015/0061197 A1 Mar. 5, 2015

(30) Foreign Application Priority Data

Mar. 21, 2012 (DE) ........................ 10 2012 204 511

(51) Int. Cl.
*B29C 51/22* (2006.01)
*B29C 51/20* (2006.01)
*B29C 51/36* (2006.01)
*B29L 31/00* (2006.01)
*B29C 51/10* (2006.01)
*B29C 51/16* (2006.01)
(Continued)

(52) U.S. Cl.
CPC ............... *B29C 51/22* (2013.01); *B29C 51/20* (2013.01); *B29C 51/36* (2013.01); *B29C 51/42* (2013.01); *B29C 51/10* (2013.01); *B29C 51/16* (2013.01); *B29C 51/428* (2013.01); *B29C 51/44* (2013.01); *B29C 2791/007* (2013.01); *B29D 22/003* (2013.01); *B29K 2101/00* (2013.01); *B29L 2031/712* (2013.01); *B29L 2031/7132* (2013.01); *B29L 2031/7136* (2013.01)

(58) Field of Classification Search
None
See application file for complete search history.

(56) References Cited

U.S. PATENT DOCUMENTS

2009/0104302 A1 4/2009 Irwin
2009/0301035 A1 12/2009 Bernig et al.

FOREIGN PATENT DOCUMENTS

CN 101060971 A 10/2007
CN 101941289 A 1/2011
(Continued)

OTHER PUBLICATIONS

International Search Report for Application No. PCT/EP2013/053206 dated Jun. 24, 2013 (2 pages).

*Primary Examiner* — Monica Huson
(74) *Attorney, Agent, or Firm* — Michael Best & Friedrich LLP

(57) ABSTRACT

The invention relates to a thermoforming device (10), in particular for cups (1) that can be filled with a foodstuff, having a mold (11) comprising an upper part (12) and a deep-drawing mold (13) arranged underneath the upper part (12) for molding at least one cup (1) in a heated sheet of film (2), wherein the deep-drawing mold (13) forms a side wall (4) and a bottom area (5) of the at least one cup (1).

10 Claims, 3 Drawing Sheets

(51) Int. Cl.
 *B29C 51/42* (2006.01)
 *B29C 51/44* (2006.01)
 *B29D 22/00* (2006.01)
 *B29K 101/00* (2006.01)

(56) References Cited

FOREIGN PATENT DOCUMENTS

DE 9108344 8/1991
EP 0158275 10/1985

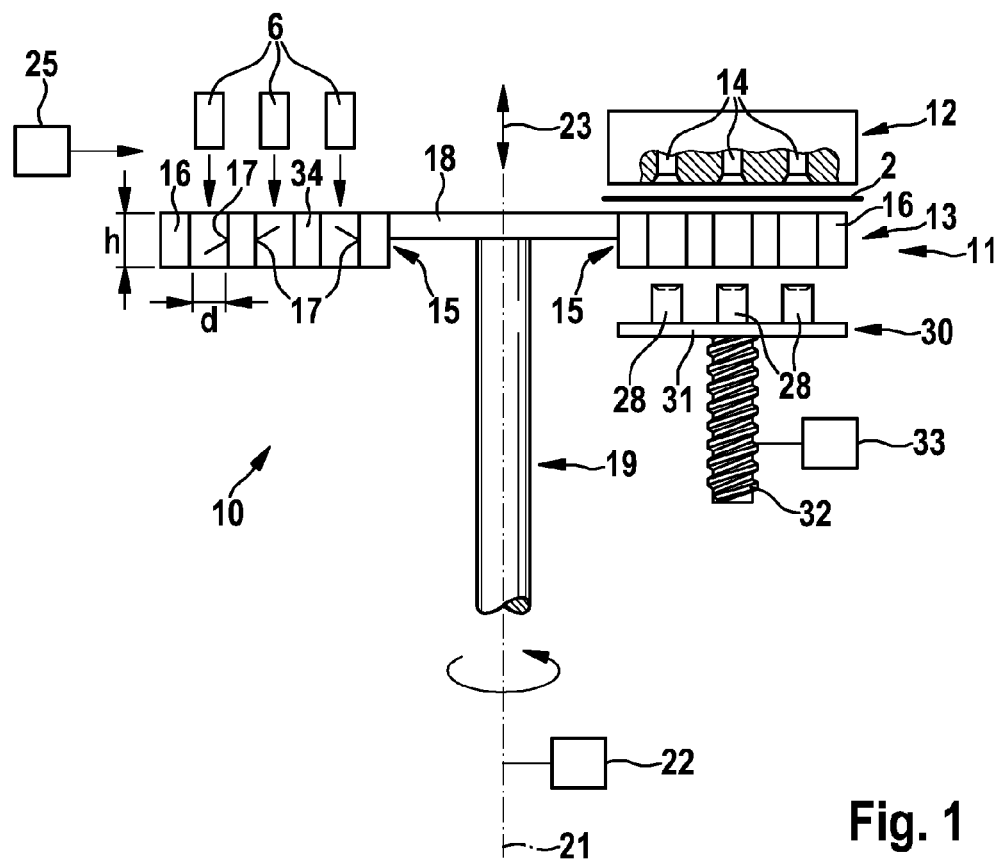
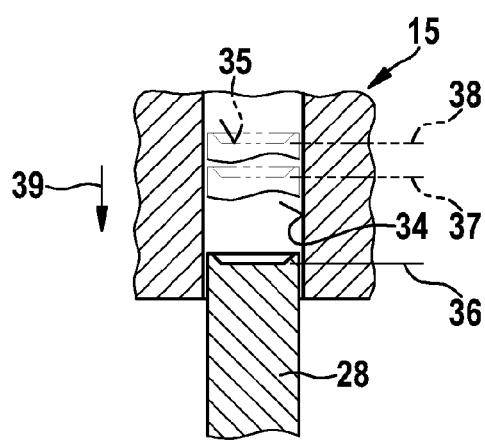
Fig. 1
Fig. 2

THERMOFORMING DEVICE

BACKGROUND OF THE INVENTION

The invention relates to a thermoforming device, in particular for cups that can be filled with a foodstuff having a molding tool, comprising an upper part and a deep-drawing mold underneath the upper part for molding at least one cup into a heated sheet of film, the deep-drawing mold forming a side wall and a bottom region on the at least one cup, the molding of the cup into the deep-drawing mold taking place by producing a positive pressure on the sheet of film in the direction of the deep-drawing mold, the deep-drawing mold comprising at least one first part-element, with a through-opening for molding the side wall, and a second part-element, formed as a component that is separate from the at least one first part-element, for molding the bottom region, the two part-elements being arranged such that they are movable in relation to one another in such a way that the second part-element can in certain regions be introduced into the end face of the through-opening of the first part-element that is facing the second part-element, and a base area of the second part-element that forms the bottom region of the cup being adapted to the cross section of the through-opening in the first part-element in such a way that, to form different container heights, the base area can be positioned to different heights of the through-opening in such a way that the base area of the second part-element is arranged circumferentially at a small distance from the circumferential wall of the through-opening of the first part-element.

By means of such a thermoforming device known from practice, multiple cups arranged next to one another are molded simultaneously into a heated sheet of film and subsequently filled with a foodstuff, such as yoghurt or the like. The filled cups are then sealed with a foil lid (consisting for example of aluminum) and, lastly, individual cups or multiple cups connected to one another are punched out from the sheet of film.

For molding the cups into the sheet of film, the known thermoforming device has a molding tool with a deep-drawing mold, which has for each cup an opening with an inner circumferential wall and a bottom region adjoining the circumferential wall. The circumferential wall and the bottom region thereby form the shape of the cup molded into the sheet of film. Furthermore, the deep-drawing mold consists of a first part-element, which is fixed with respect to an upper part of the thermoforming device and interacts with a height-adjustable, punch-like second element (for each opening). The height-adjustable second element allows different cup heights to be realized. An important aspect of this is that the first element is always arranged in congruence with the upper part of the thermoforming device or with the sheet of film, and so the accessibility to the openings of the first device is made more difficult. In addition, there are applications in which labels are to be attached to the outer sides of the cups, it being intended for this to take place already before the molding of the cups, that is to say in the region of the thermoforming device ("in-mold labeling"). The feeding device required for this needs a relatively big installation space in the region of the first part-element, and so, because of the described arrangement of the two part-elements on the thermoforming device, this is often difficult to realize in practice. It is also disadvantageous that, because of the work sequences, in which the labels first have to be introduced into the openings of the first part-element and only then can the molding of the containers take place, the known thermoforming device has a relatively low output.

SUMMARY OF THE INVENTION

Proceeding from the prior art described, the invention is based on the object of developing a thermoforming device, in particular for cups that can be filled with a foodstuff, in such a way as to provide a thermoforming device that is easily accessible in the region of the deep-drawing mold, is of a simple form and makes it possible for additional devices that interact with the first part-element, in particular a label feeding device, to be arranged particularly easily outside the deep-drawing mold. This object is achieved according to the invention by the deep-drawing mold consisting of at least two first part-elements and a second part-element, and by the at least two first part-elements being arranged such that they can be adjusted into a position in which they are arranged out of alignment outside the upper part and the second part-element, the second part-element always being arranged such that it is fixed in congruence with the upper part.

It is particularly preferred for the invention to be used in the case of a thermoforming device in which a device for feeding labels into the through-opening of the first part-element is provided, and that the device is arranged in operative connection with one first part-element when another first part-element is arranged in operative connection with the second part-element. If formed in such a way, a particularly high output can be achieved, since it is possible by means of the device to feed labels to the one part-element while the other part-element is already adorned with the labels and arranged in operative connection with the upper part. In other words, this means that, in a standstill phase of the carrier, operations can be performed simultaneously on both first part-elements.

A construction for adjusting the part-elements that is of a relatively simple structural design is achieved when the deep-drawing mold comprises two first part-elements, which are arranged rotatably about an axis on a columnar carrier, and the two first part-elements are arranged at 180° in relation to one another.

For molding the cups into a defined position (in terms of height), the second part-element of the deep-drawing mold must be moved into the first part-element. In order to realize this requirement with relatively little expenditure on equipment, it is provided in a further configuration of the invention that is preferred in terms of structural design that the drive of the second part-element takes place by means of a lifting spindle drive.

Furthermore, it may be provided that, for easier demolding and for the further transporting of the cups with the corresponding portion of the sheet of film, the first part-element is additionally arranged such that it is height-adjustable.

In order to make relatively easy demolding of the cups from the deep-drawing mold possible without an additional device, it is additionally proposed that, for the demolding of the cups from the first part-element, the second part-element can be moved with its base area into the first part-element in the direction of the upper part beyond the position for molding the bottom region.

In a preferred geometrical form of the deep-drawing mold, it is proposed that the circumferential wall of the through-opening in the first part-element, at least in the region where the second part-element is led into the first part-element, and the second part-element in the corresponding region is respectively formed with straight side walls, that is to say without lead-in chamfers.

To reduce the cycle times, and consequently to increase the output, of the thermoforming device, it is additionally proposed that at least the base area of the second part-element is formed as a cooled base area. As a result, rapid cooling down of the heated sheet of film takes place after the molding of the cup or setting of the sheet of film takes place in the bottom region of the cup. As a result, the cups can be demolded quickly.

BRIEF DESCRIPTION OF THE DRAWINGS

Further features, advantages and details of the invention are evident from the following description of preferred exemplary embodiments and by reference to the drawing, in which:

FIG. 1 shows in a simplified representation a thermoforming device according to the invention for cups in side view, FIG. 2 shows a partial region of a deep-drawing mold with a punch-like second part-element that can be moved into the through-opening of the deep-drawing mold, in various height positions, in longitudinal section

The same components or components with the same function are provided with the same reference numerals in the figures.

DETAILED DESCRIPTION

Figure 3:
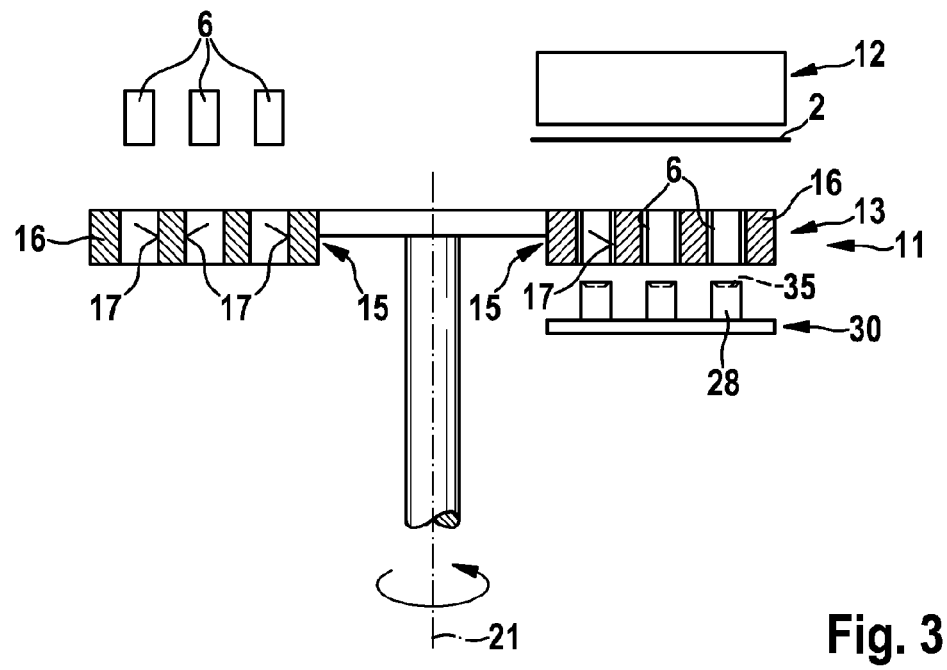
FIG. 3 to FIG. 5 show the thermoforming device according to FIG. 1 in a representation that is simplified further in comparison with FIG. 1 for explaining various working positions of the thermoforming device, respectively in longitudinal section.

In FIG. 1, a thermoforming device 10 according to the invention, in particular for cups 1 that can be filled with a foodstuff, is represented in a simplified form. The cups 1 are molded by means of the thermoforming device 10 into a heated sheet of film 2 (of plastic), and, after leaving the thermoforming device 10, are filled with the foodstuff, for example with yoghurt. Lastly, the cups 1 are closed in a sealed manner on their upper side with a foil lid, consisting for example of aluminum. As can be seen by referring to FIG. 5, the cups 1 have an opening region 3, a peripheral side wall 4 and, on the side opposite from the opening region 3, a bottom region 5.

The thermoforming device 10 comprises a molding tool 11, which has an upper part 12 and a deep-drawing mold 13, arranged underneath the upper part 12. The sheet of film 2 is arranged inside the thermoforming device 10, between the upper part 12 and the molding tool 11. In particular, the upper part 12 has a heating device (not represented) for heating the sheet of film 2 and, arranged on the side facing the sheet of film 2, nozzle-like outlets 14, which are connected to a source of positive pressure that is likewise not represented, and which serve for bringing the heated sheet of film 2 into operative connection with the deep-drawing mold 13.

The deep-drawing mold 13 consists of at least two, preferably precisely two, first part-elements 15, which are identically formed. The first part-elements 15 are formed as a deep-drawing plate 16 with in each case multiple through-openings 17 of the same form. The two deep-drawing plates 16 are arranged on an arm 18 of a columnar carrier 19 at the same distance from an axis of rotation 21. The carrier 19 can be rotated about the axis of rotation 21 by means of a first drive motor 22 and additionally can be lifted and lowered in the direction of the longitudinal axis 21 in the direction of the double-headed arrow 23 by means of a drive that is not represented. The two first part-elements 15 are arranged at equal angular distances from one another, in the exemplary embodiment represented consequently offset by 180° from one another.

On the side of the carrier 19 that is laterally opposite from the upper part 12 of the molding tool 11, that is to say outside the upper part 12, a device 25 for feeding labels 6 onto the side walls 4 of the cups 1 is represented in an indicative manner. By means of the device 25, which is known per se and therefore not explained in any more detail, labels 6 can be provided, rolled, and introduced into the through-openings 17 of the first part-element 15, and positioned therein on the walls of the through-openings 17.

As can be seen in particular when FIG. 1 is viewed together with FIG. 2, the first part-element 15 has three through-openings 17, preferably arranged at equal distances next to one another, the longitudinal axes of which run parallel to the axis of rotation 21. Furthermore, it may be provided that further groups of three through-openings 17 each are provided parallel to the plane of the drawing of FIG. 1, and so, depending on the number of through-openings 17, a multiple of three cups 1 can be respectively molded simultaneously into the sheet of film 2. The through-openings 17 are formed as through-openings 17 with straight side walls, that is to say without lead-in chamfers. In the exemplary embodiment represented, they have a round cross section with the diameter d over the entire height h of the first part-element 15. Alternatively, however, it is also conceivable that the through-openings 17 have for example a rectangular or square cross section, in particular with rounded edges.

The through-openings 17 in a first part-element 15 interact with punch-like continuations 28 of a second part-element 30 of the deep-drawing mold 13. The arrangement of the continuations 28 is in this case adapted to the arrangement of the through-openings 17 in the first part-element 15. As can be seen in particular by referring to FIG. 2, the continuations 28 can be introduced into the through-openings 17 of the first part-element 15 on the end face of the first part-element 15 that is facing away from the upper part 12. For this purpose, the continuations 28 are arranged on a baseplate 31, which can be seen in FIG. 1 and is coupled by way of a spindle drive with a spindle 32 to a second drive motor 33. By means of the second drive motor 33, the continuations 28 can be introduced axially into the through-openings 17, the cross section of the continuations 28 being adapted to the cross section of the through-openings 17 in such a way that only a small (radial) gap is formed between the outer circumference of the continuations 28 and the circumferential wall 34 of the through-opening 17, which is required to allow the continuations 28 to be introduced into the through-openings 17 without excessive friction.

The end face of a continuation 28 that is facing the upper part 12 forms a base area 35, which during the thermoforming forms the bottom region 5 of the cup 1. By contrast, the circumferential wall 34 in the through-opening 17 serves for forming the side wall 4 on the cup 1. As can be seen particularly clearly by referring to FIG. 2, the continuation 28 can be introduced into the through-opening 17 at least until it is in two positions identified by the height lines 36 and 37. In the lower position (height line 36), cups 1 of a greater cup height can be formed by means of the thermoforming device 10 than in a position of the continuation 28 in the height line 37. The two height lines 36 and 37 consequently represent the two axial extreme positions of the continuation 28 in the through-opening 17 for producing a cup 1 with a minimum cup height and a maximum cup height, respectively. Also depicted in addition is a height line 38, which identifies a position of the continuation 28 that is located still further axially in the through-opening 17 than the height line 37. In this position of the continuation 28, the cup 1 can be demolded from the molding tool 11. The demolding of the cups 1 from the molding tool 11 and the introduction of the continuations 28 into the through-openings 17 of the first part-element 15 takes place by lowering the first part-element 15 in the direction of the arrow 39, or else by additionally raising the continuations 28 by means of the second drive motor 33.

To be able to demold the cups 1 as quickly as possible from the deep-drawing mold 13 after the molding of the cups 1 into the sheet of film 2, it is provided that at least the continuations 28 are formed in the region of the base area 35 such that they are cooled.

The thermoforming device 10 described so far works as follows, reference being made hereafter to FIGS. 3 to 5. In the position of the thermoforming device 10 that is represented in FIG. 3, the through-openings 17 of the one first part-element 15, with the labels 6 already arranged therein, are aligned in alignment with the continuations 28 of the second part-element 30. Furthermore, the one first part-element 15 is in a position axially at a distance from the upper part 12. Labels 6 are provided at the height of the upper part 12 for introducing into the through-openings 17 of the other first part-element 15 by means of the device 25.

Figure 4:
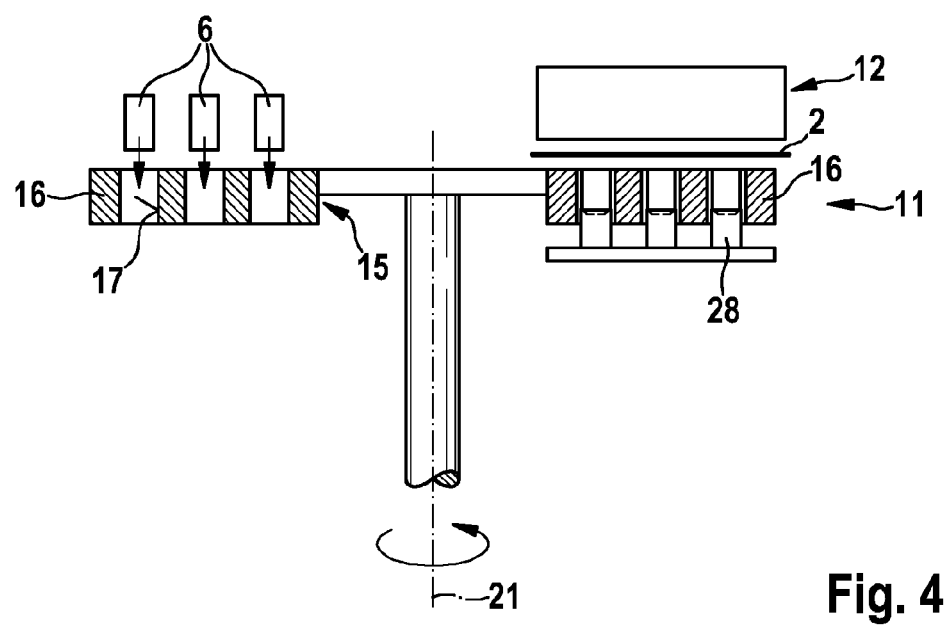

In FIG. 4, a raised position of the first part-elements 15 is represented, a position in which the through-openings 17 of the one first part-element 15 are located directly underneath the (heated) sheet of film 2. Furthermore, the continuations 28 have been introduced by means of the second drive motor 33 into the through-openings 17, into a raised position, which is required in order to form cups 1 with a defined height. It can be seen furthermore that a positive pressure can act directly on the heated sheet of film 2 through the outlets 14 explained in connection with FIG. 1. At the same time, the labels 6 provided at the other first part-element 15 are introduced into the through-openings 17.

Figure 5:
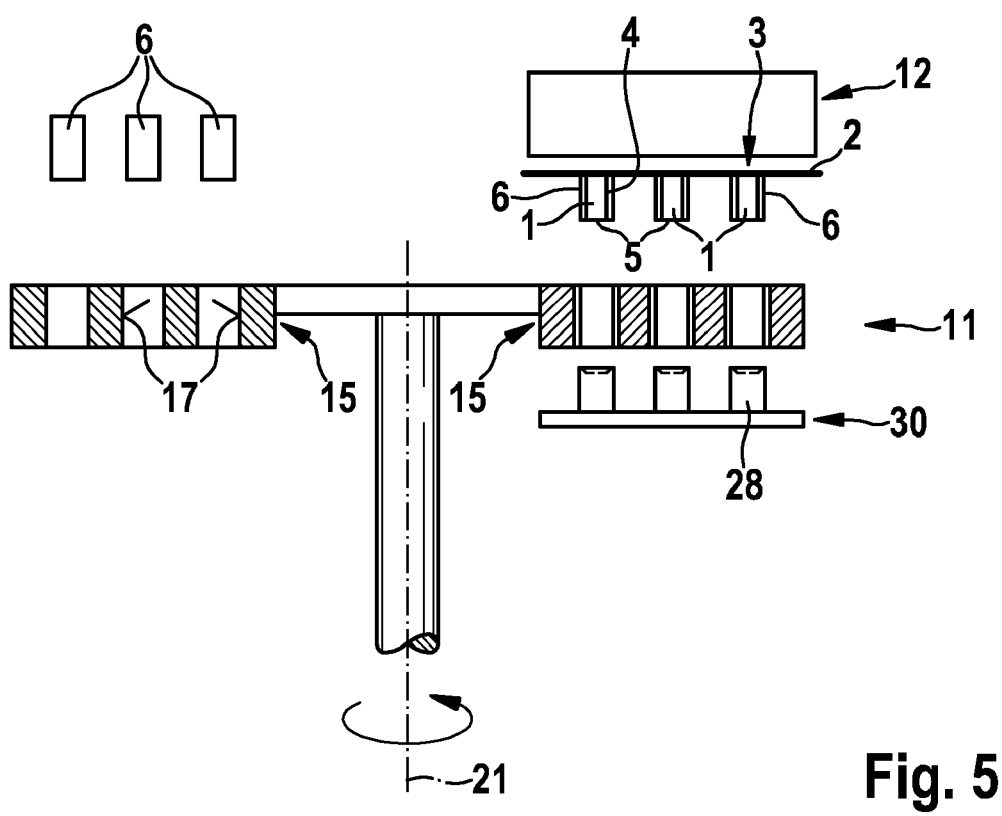

In the position of the thermoforming device 10 that is represented in FIG. 5, the cups 1 have already been demolded from the one first part-element 15 and the continuations 28 have already been positioned again outside the through-openings 17. In this position, the deep-drawing mold 13 can be pivoted by 180° about the axis of rotation 21, and so the other first part-element 15, with the labels 6 positioned in the meantime in the through-openings 17, can be aligned with the continuations 28. Furthermore, the sheet of film 2 must be conveyed further by a certain advancement perpendicularly to the plane of the drawing of FIGS. 3 to 5 in order to be able to mold the next portion of the sheet of film into the through-openings 17 of the other first part-element 15.

The thermoforming device 10 described so far can be changed or modified in a variety of ways without departing from the concept of the invention. Thus, for example, it is conceivable to form the through-openings 17 with such a cross section that the cross section of the through-openings 17 is only formed without lead-in chamfers in the part-region into which the continuations 28 can plunge into the through-openings 17, while in the region above that, that is to say in the direction of the upper part 12, the through-openings 17 may have a different cross section, or more or less any desired cross section, with lead-in chamfers. In addition, it is also conceivable to arrange both of the first part-elements 15 such that they are not pivotable, but for example (linearly) displaceable. All that is important is that, for feeding the labels 6, the one part-element can be brought into a position outside the upper part 12 or the sheet of film 2.

The invention claimed is:

1. A thermoforming device (10), having a molding tool (11), comprising an upper part (12) and a deep-drawing mold (13) underneath the upper part (12), for molding at least one cup (1) into a heated sheet of film (2), the deep-drawing mold (13) forming a side wall (4) and a bottom region (5) on the at least one cup (1), molding of the cup (1) into the deep-drawing mold (13) taking place by producing a positive pressure on the sheet of film (2) in a direction of the deep-drawing mold (13), the deep-drawing mold (13) comprising at least one first part-element (15), with a through-opening (17) for molding the side wall (4), and a second part-element (30), formed as a component that is separate from the at least one first part-element (15), for molding the bottom region (5), the first and second part-elements (15, 30) being movable in relation to one another in such a way that the second part-element (30) can in certain regions be introduced into an end face of the through-opening (17) of the first part-element (15) that is facing the second part-element (30), and a base area (35) of the second part-element (30) that forms the bottom region (5) of the cup (1) being adapted to a cross section of the through-opening (17) in the first part-element (15) in such a way that, to form different container heights, the base area (35) is configured be positioned to different heights (36, 37) of the through-opening (17) in such a way that the base area (35) of the second part-element (30) is arranged circumferentially at a small distance from a circumferential wall (34) of the through-opening (17) of the first part-element (15), characterized in that the deep-drawing mold (13) comprises at least two first part-elements (15) and the second part-element (30), and in that the at least two first part-elements (15) are configured to be adjusted into a position in which the at least two first part-elements are arranged out of alignment outside the upper part (12) and the second part-element (30), the second part-element (30) always being fixed in congruence with the upper part (12).

2. The thermoforming device as claimed in claim 1, further comprising a device (25) for feeding labels (6) into the through-opening (17) of the first part-element (15), wherein the device (25) is arranged in operative connection with one first part-element (15) when another first part-element (15) is arranged in operative connection with the second part-element (30).

3. The thermoforming device as claimed in claim 1, characterized in that the deep-drawing mold (13) comprises two first part-elements (15), which are arranged rotatably about an axis (21) on a columnar carrier (19), and in that the two first part-elements (15) are arranged at 180° in relation to one another.

4. The thermoforming device as claimed in claim 1, characterized in that a drive of the second part-element (30) takes place by means of a lifting spindle drive (32, 33).

5. The thermoforming device as claimed in claim 1, characterized in that the first part-element (15) is additionally height-adjustable.

6. The thermoforming device as claimed in claim 1, characterized in that, for demolding of the cups (1) from a first part-element (15), the second part-element (30) can be moved with its base area (35) into the first part-element (15) in a direction of the upper part (12) beyond a position for molding the bottom region (5).

7. The thermoforming device as claimed in claim 1, characterized in that a first part-element (15) has multiple through-openings (17), in that the second part-element (30) has for each through-opening (17) a punch-like continuation (28), forming the base area (35), and in that the continuations (28) are arranged on a common baseplate (31).

8. The thermoforming device as claimed in claim 1, characterized in that the circumferential wall (34) of the through-opening (17) in the first part-element (15), at least in a region where the second part-element (30) is led into the first part-element (15), and the second part-element (30) in a corresponding region is respectively formed with straight side walls without lead-in chamfers.

9. The thermoforming device as claimed in claim 6, characterized in that the cross section of the through-opening (17) in the first part-element (15) is formed with straight side walls without lead-in chamfers over an entire height (h).

10. The thermoforming device as claimed in claim 6, characterized in that at least the base area (35) of the second part-element (30) is formed as a cooled base area (35).

\* \* \* \* \*